Feb. 22, 1966  H. FISCHER  3,236,176

PRESS FOR STRIP MATERIAL

Filed March 6, 1963  2 Sheets-Sheet 1

HERBERT FISCHER
INVENTOR.

BY Karl F. Ross

AGENT

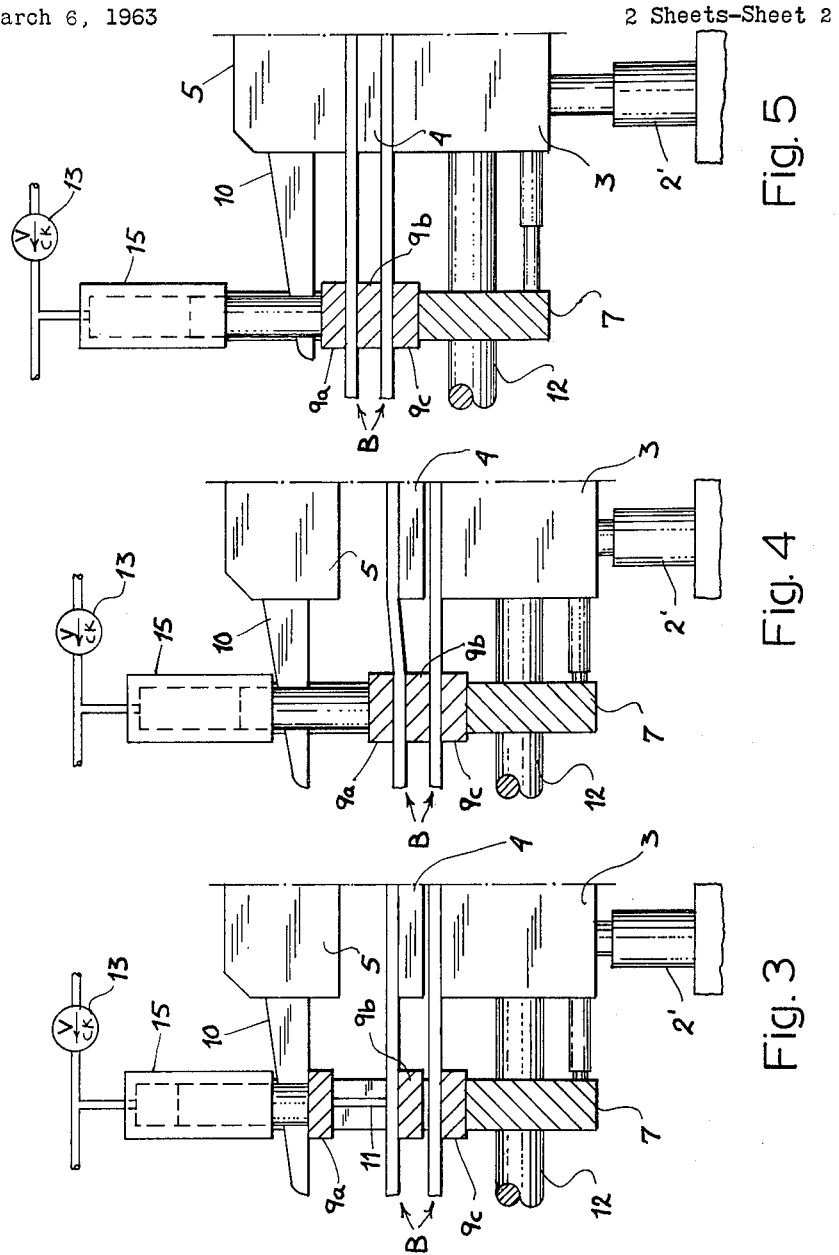

_United States Patent Office_ 3,236,176
Patented Feb. 22, 1966

3,236,176
PRESS FOR STRIP MATERIAL
Herbert Fischer, Krefeld, Germany, assignor to G. Siempelkamp & Co., Maschinenfabrik, Krefeld, Rhineland, Germany, a corporation
Filed Mar. 6, 1963, Ser. No. 263,341
Claims priority, application Germany, Mar. 7, 1962, S 78,364
9 Claims. (Cl. 100—195)

The present invention relates to a press for strip material and, more particularly, to presses generally employed in the production and treatment of elongated flexible bands, e.g. rubber and composition belts and the like.

It is well known to produce laminated flexible bands from elastomeric, thermoplastic and synthetic resin material with the aid of presses designed to compact the band or belt to the desired thickness and impart there to a densification design to yield strip material of great strength. Such presses have been used for the laminating of belts and the like, for the vulcanization of rubber surface layers to various types of substrate and for the treatment of some nonflexible as well as flexible material. In general, successive longitudinal portions of the strip material are fed between the platens of a press, one of whose platens can be the bedplate thereof, and is stretched taut just prior to the application of the press pressure. To this end of the press may be provided with a clamping device whose clamp members engage the bend and are shiftable in the direction of band displacement for stretching the tensioning the strip. It is a problem in the use of such process, especially when a multiplaten press is employed, that a substantial deflection or bend is imparted to the strip as the press platens close, thereby straining the strip and stretching it in a nonuniform and undesirable manner. This stressing or looping of the strip over the edge of the press platen or an auxiliary support prevents uniform tensioning of the bend. For example, in a multiplaten press wherein a plurality of vertically spaced bands are fed between superimposed platens and the clamping device is mounted upon a stationary portion of the press, one or another of the clamping elements will almost invariably deflect the uppermost strips to a greater extent than the lowermost ones and thereby unevenly tension these upper members.

It is an object of the present invention to provide a press for strip material wherein the forgoing disadvantages are avoided.

A more specific object of the invention is to provide a pretensioning apparatus whereby a uniform stretching of a plurality of superimposed bands can be carried out in a multiplaten device.

These objects are attained, in accordance with the present invention, by providing a press having at least one movable platen and, preferably, a plurality of superimposed movable platens, with a clamping and tensioning device whose belt-engaging surfaces are maintained substantially in alignment with the corresponding surface of the movable platens. The clamping device may thus be provided with control means adapted to displace the several clamping elements in step with the motion of the movable platens. When the press is almost completely closed, but prior to the application of substantial pressure to the strips passing therethrough, or at least after all of the movable platens are in engagement with their upper and lower strips, the control means is actuated to apply pressure to the clamping members, thereby effecting engagement of these members with the strips. The clamping device may then be displaced relatively to the press along the strips to tension the latter as the press closes with application of full treatment pressure.

According to a more specific feature of the invention, the press comprises a movable bedplate and a relatively stationary anvil member against which the strips are compressed. Between the bedplate and the anvil platen there is positioned at least one and preferably a plurality of intermediate platens, which are movable with the bedplate upon closure of the press. In this case the press may, according to the invention have real means on the bedplate for carrying the clamping means while permitting longitudinal displacement of the latter along the band. The clamping means may include a support or frame member as mounted upon the bedplate from which a clamping member associated with each of the intermediate platens is suspended. The control means should then include mechanism cooperating with the suspended elements for holding them substantially in alignment with the respective platens during displacement of the bedplate and the clamp frame.

This control mechanism may, according to still another feature of this invention, include a further clamping member which is movably mounted upon the frame and is provided with pressure means for locking the clamping element in engagement with the belts while the stationary or anvil member of the press is formed with means engageable with the last-mentioned clamping element to maintain the latter against displacement during at least the initial movement of the bed. In this case the other clamping elements may be directly suspended from the clamping member engaged by the stationary portion of the press. Thus suspension may be carried out advantageously with the aid of lost-motion connections or the like.

The mechanism for maintaining the clamping members associated with each of the intermediate platens, i.e. those between the bedplate and the stationary platen, may include arm means or the like extending from the latter into engagement with the upper clamping member for maintaining it and the clamp members suspended therefrom in position during displacement of the bedplate. If the press is provided with a simultaneous-closure device (e.g. of the type shown in commonly assigned U.S. Patent No. 3,050,777), precautions will have to be taken to insure that the clamping members will be displaced concurrently with the platens. When, however, as is customary in strip presses for the vulcanization of belts and the finishing of conveyor bands, a vertical press is employed with the moving bedplate rising vertically toward the upper stationary platen, the intermediate platen can merely be supported for successive entrainment by the bedplate via the intervention of the strip material. Thus the bedplate will successively lift the platens. In this instance, the suspended clamping elements are also successively elevated and brought into engagement with the several strips to guarantee freedom from deflection of the bands. Only when the uppermost intermediate platen is brought to bear on the strip thereabove, will the control means be actuated to urge the clamp members against the strips with the clamping force. It should be noted, however, that the clamping device or means can then be shifted longitudinally of the bedplate to tension the strips before the compression pressure is applied in the press. It is clear, therefore, that the apparatus can be so constructed that the arms only act upon the uppermost clamping member with the remaining members suspended therefrom. The control means can include a pneumatic or hydraulic piston-and-cylinder arrangement for applying the pressure to the clamp members. In this case the cylinder arrangement will be anchored to the frame or support means, which is vertically entrained by the bedplate, while means is provided to permit relative displacement of the movable clamp members and this frame during the press-closing stroke. This means may include a line connected with the cylinder and open to a source of low-pressure fluid (e.g. a reservoir or sump) from which the power fluid can be aspirated into the cylinder in the course of displacement of the clamp members relative to the frame by the control mechanim. This line can, advantageously, include a check valve to enable high pressure to be applied to the cylinder. A restoring-cylinder arrangement, which is loaded during closure of the press, can be provided for returning the device to its open condition.

The above and other objects, features and advantages of the present invention will become more readily apparent from the following description, reference being made to the appended drawing in which:

FIGS. 3–5 are views similar to FIG. 2 showing successive operating positions of the clamping means.

Figure 1:
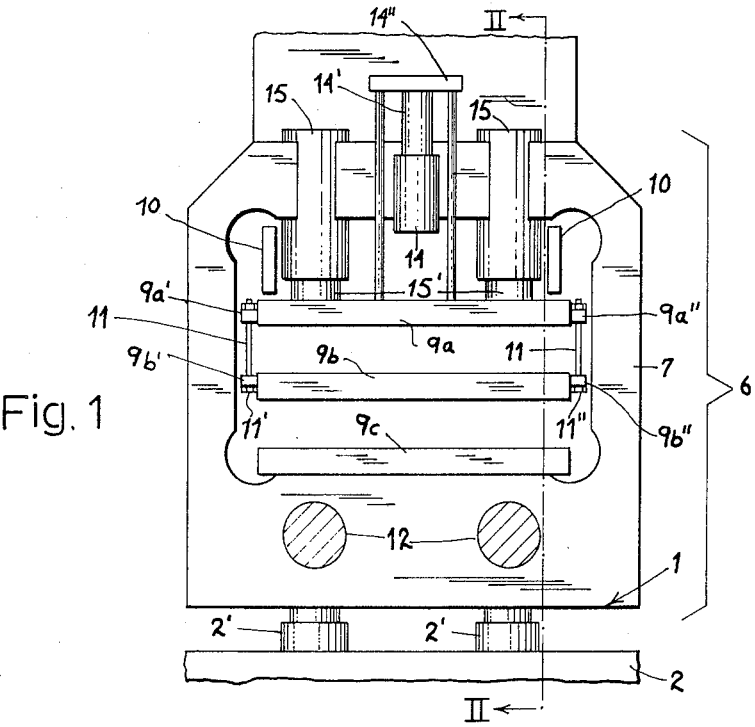
FIG. 1 is an end view of a press showing a tensioning device, according to the invention at its forward extremity.
Figure 2:
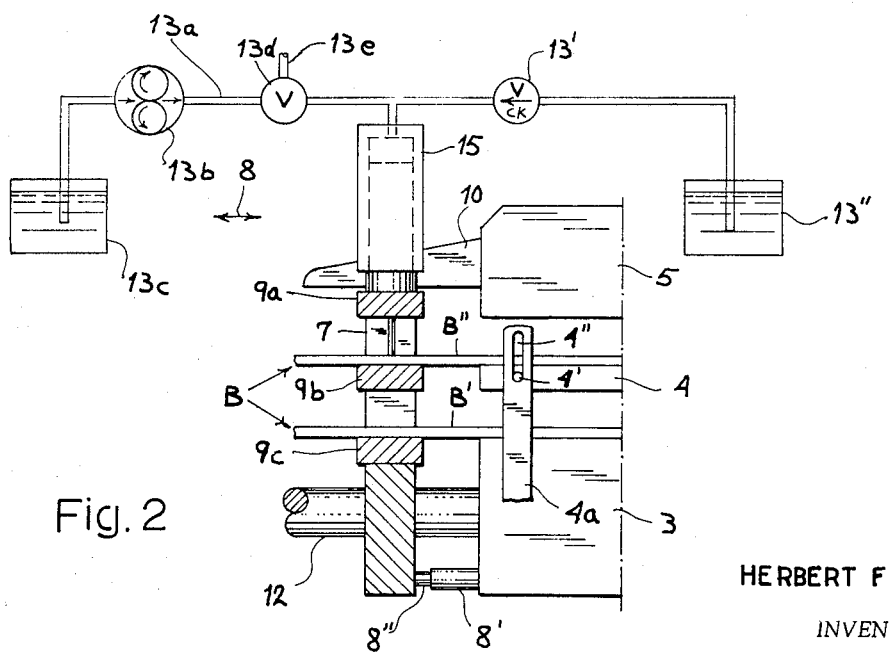
FIG. 2 is a side view of the press partly in section along the line II—II of FIG. 1 with the strips to be compressed in place.

FIG. 1 shows a belt or band press 1 whose support 2 carries a vertically displaceable bedplate 3 via the usual power cylinders 2'. The latter effect a vertical displacement of the bedplate relative to the stationary platen or head 5 of the press. The press structure is schematically illustrated because, in most respects, it is conventional with the head 5 supported in a suitable frame (not shown). A plurality of intermediate platens 4 (one of which is shown) are positioned between the bedplate 3 and the head 5 and may be carried by a simultaneous closure device, flexible cables, or some other lost-motion support. In the press illustrated each plate 4 is provided with pins 4' at its corners, the pins being received within slots 4'' of supports 4a upon which the platens 4 rest in the open condition of the press.

The press is, according to the invention, provided with a stretching and clamping device 6 whose frame 7 and longitudinally slidable upon rails 12 extending from the bedplate 3 so that this frame or support means 7 is vertically displaceable with the latter. The frame is, however, slidable horizontally (i.e. in the direction of the arrows 8) by conventional force-applying means, schematically represented as another hydraulic cylinder 8', which is anchored to the bedplate 3, whose piston 8'' bears upon the frame 7. A pair of hydraulic cylinders 15 is mounted upon frame 7, the cylinders having pistons 15' secured to the upper clamping member 9a of a plurality of such members 9a–9c interleaved with the strips or bands B which pass between the platens. The upper member 9a, however, is provided with a pair of lugs 9a', 9a'' from which a pair of guide rods 11 depend. The intermediate clamp member 9b is likewise provided with lugs 9b', 9b'' which slidably engage these rods 11, upon which the clamp member 9b rests, to form therewith a lost-motion linkage. When more than one intermediate plate 4 is provided, a corresponding number of intermediate clamp members 9b is also used with each of the clamp members being slidable along the guide rods 11 while being held in their lower limiting position by means of nuts or bolt heads 11', 11''. The lower clamp member 9c is fixed to the frame 7.

The control means includes hydraulic cylinders 15 and a mechanism for maintaining the clamp members in their required positions. This mechanism comprises a pair of arms 10, rigid with the head 5, which act upon the upper clamp member 9a as will be apparent in greater detail hereinafter. The mechanism is provided with a low-pressure line 13 which connects the cylinder 15 with a reservoir or sump 13'' via a check valve 13'. This check valve permits aspiration of fluid from the sump 13'' and thereby eliminates the retarding effect of the piston/cylinder arrangement. A high-pressure line 13a is also provided and serves to feed fluid from a pump 13b and a reservoir 13c via a control valve 13d to the cylinders 15 when the clamping pressure is to be applied. A restoring cylinder 14, forming a closed air chamber, is rigid with the frame 7 and has its piston 14' anchored to the upper clamp member 9a via a bracket 14''.

The operation of the device will now be described with particular reference to FIGS. 2–5. Lengths of strip material B are fed between the platens 3, 4 . . . , of the press 1 which is shown in its open condition in FIG. 2. The bands thus rest upon the bedplate 3 and intermediate platen 4 as well as upon clamping members 9c and 9b. Cylinders 2 are then actuated to elevate the bedplate 3, which like platens 4 and 5 may be heated if vulcanization is desired, thereby lifting the support means 7 of the clamping device 6 to prevent any deflection of band B'. Since platen 4 is not yet in motion, this action would, in the absence of the control mechanism including arms 10, result in an elevation of clamp member 9b and thus deflect band B''. The arms, however, maintain this clamp member substantially in alignment with the intermediate platen during the entire course of press closure (FIG. 3), fluid being aspirated into the cylinders 15 during this time. When the press reaches the position shown in FIG. 3, a limited switch or other conventional device can be tripped to open valve 13d and permit fluid under pressure to flow into the cylinders 15 thereby driving the upper clamping device to the left as also indicated in this figure (FIG. 4). Closure of the press can then continue (FIG. 5) with, however, a prior horizontal stretching of the band by means of cylinder 8', the latter displacing the clamping device to the left as also indicated in this figure by the extended condition of the piston 8''. Full press pressure can then be applied. When the bedplate 3 of press 1 descends, the compressed fluid within cylinder 14 restores the clamping member 9a to its original position, while discharging the fluid within cylinders 15 via outlet 13e.

The invention as illustrated and described admits of many modifications within the ability of persons skilled in the art, all such modifications being deemed within the spirit and scope of the appended claims.

1. An apparatus for placing strip material comprising multiplaten press having a movable bedplate, a stationary platen extending parallel to said bedplate and disposed in the direction of displacement thereof and at least one intermediate platen movably interposed between said bedplate and said stationary platen; means for displacing said bedplate toward said stationary platen for compressing a first strip against said intermediate platen and a second strip between said intermediate platen and said stationary platen; clamping means adjacent said press for tensioning said strips, said clamping means including a support mounted upon said bedplate for entrainment thereby toward and away from said stationary platen, means for displacing said support longitudinally of said bedplate along said strips, a plurality of clamping members mounted on said support and interleaved with said strips, at least one of said members and said intermediate platen being engageable with a common surface of one of said strips, and control means for urging said members against said strips; and mechanism including at least one arm on said stationary platen engageable with one of said members for maintaining said one of said members in substantial alignment with said intermediate platen during at least part of the displacement thereof toward said stationary platen to limit deflection of said one of said strips.

2. An apparatus for pressing strip material comprising a vertical multiplaten press having a generally horizontal vertically movable bedplate, a stationary horizontal platen vertically spaced above said bedplate, and at least one horizontal intermediate platen movably interposed between said bedplate and said stationary platen; means for displacing said bedplate toward said stationary platen with entrainment of said intermediate platen for compressing a first strip against said intermediate platen and a second strip between said intermediate platen and said stationary platen; clamping means adjacent said press for tensioning said strips, said clamping means including a support mounted on said bedplate for vertical entrainment thereby, means for displacing said support longitudinally of said bedplate along said strips, a plurality of generally horizontal clamping members mounted on said support and interleaved with said strips, at least one of said members and said intermediate platen being engageable along the respective upper surfaces with a common one of said strips, and control means for urging said members against the said strips; and mechanism for maintaining said one of said members in substantial alignment with said intermediate platen during at least part of the displacement thereof toward said stationary platen to limit deflection of said second strip, said mechanism including arm means on said stationary platen for holding said one of said members against displacement together with said support means.

3. An apparatus as defined in claim 2 wherein said one of said members is suspended from an uppermost one of said members via a lost-motion connection, said arm means engaging said uppermost member.

4. An apparatus as defined in claim 2 wherein said control means includes fluid-pressure means mounted on said support and bearing downwardly upon said uppermost member for clamping said strips between said members.

5. An apparatus as defined in claim 4 wherein said fluid-pressure means includes a piston-and-cylinder arrangement, said mechanism further comprising means for admitting fluid to said arrangement during displacement of said support with said bedplate.

6. An apparatus as defined in claim 5 wherein said means for admitting fluid to said arrangement includes a source of fluid under relatively low pressure and check-valve means interposed between said arrangement and said source.

7. An apparatus as defined in claim 3 further comprising restoring means acting upon said uppermost member for returning same to its original position upon opening of the press.

8. An apparatus as defined in claim 7 wherein said restoring means include a fluid-pressure cylinder interposed between said support means and said uppermost member for loading upon closure of said press.

9. An appartus as defined in claim 2 wherein said bedplate is provided with longitudinally extending rail means, said support means comprising a frame slidably mounted upon said rail means.

References Cited by the Examiner
UNITED STATES PATENTS

| | | | |
|---|---|---|---|
| 2,543,582 | 2/1951 | Lyjiynen | 166—583 |
| 2,759,217 | 8/1956 | Peterson | 156—494 |

EARL M. BERGERT, *Primary Examiner.*

DOUGLAS J. DRUMMOND, *Examiner.*